United States Patent [19]

Vriend

[11] 4,163,633
[45] Aug. 7, 1979

[54] APPARATUS FOR PRODUCING POWER FROM WATER WAVES

[76] Inventor: Joseph A. Vriend, P.O. Box 505, Squamish, British Columbia, Canada, V0N 3G0

[21] Appl. No.: 746,402

[22] Filed: Dec. 1, 1976

[51] Int. Cl.² .................... F04B 17/00; F04B 35/00
[52] U.S. Cl. ................... 417/332; 417/333; 60/496; 60/506
[58] Field of Search ........... 417/331, 332, 333, 484, 417/543; 60/495, 496, 500, 506

[56] References Cited

U.S. PATENT DOCUMENTS

| 3,529 | 4/1844 | Wolfe | 417/484 |
|---|---|---|---|
| 2,020,361 | 11/1935 | Johnston | 417/484 X |
| 2,028,056 | 1/1936 | Franklin | 417/333 |
| 2,148,957 | 2/1939 | Morris et al. | 417/543 |
| 2,935,024 | 5/1960 | Kofchl | 60/496 X |
| 3,020,870 | 2/1962 | Skovranek | 417/332 X |
| 3,970,415 | 7/1976 | Widecrantz | 417/332 |
| 4,023,515 | 5/1977 | Tharaldson | 417/332 |

Primary Examiner—Carlton R. Croyle
Assistant Examiner—Richard E. Gluck
Attorney, Agent, or Firm—Fulwider, Patton, Rieber, Lee & Utecht

[57] ABSTRACT

An apparatus for producing power from water waves. The apparatus comprises a main pipe having at least one inlet and an outlet. A pump has an inlet to admit ambient water and an outlet that communicates with the inlet of the pipe. A valve controls the inlet to the pump. Another valve controls the outlet to the pump. A buoyancy vessel is attached to the pump. The buoyancy vessel has a slightly positive buoyancy to follow the motion of the waves. Reciprocation of the buoyancy vessel permits water to enter the pump, through the inlet, and then forces water from the outlet into the pipe.

18 Claims, 13 Drawing Figures

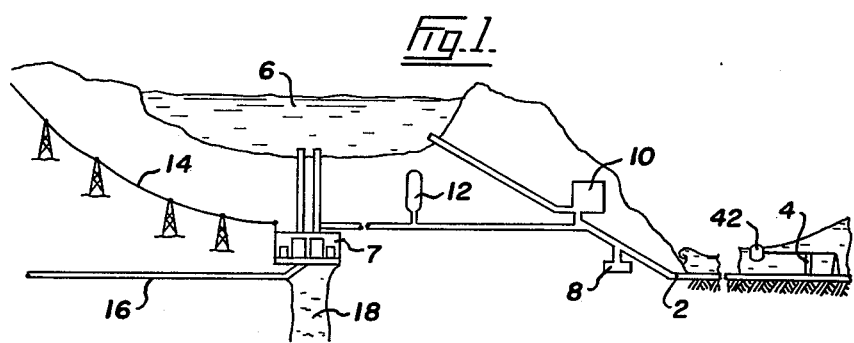
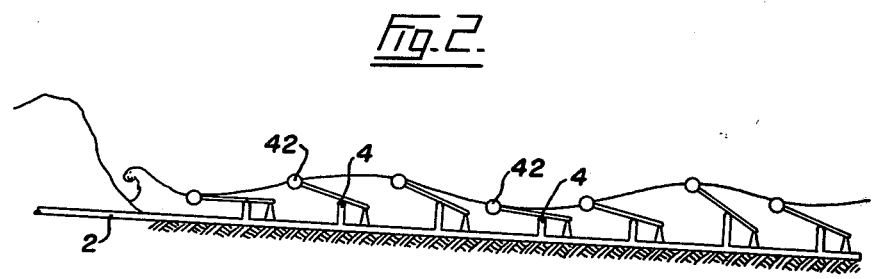
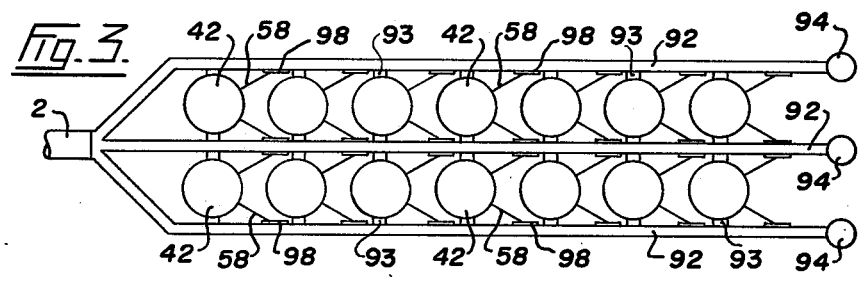
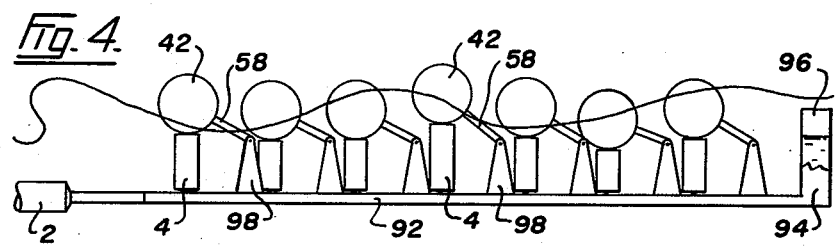
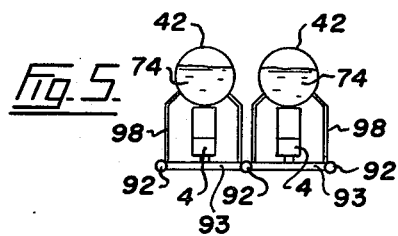

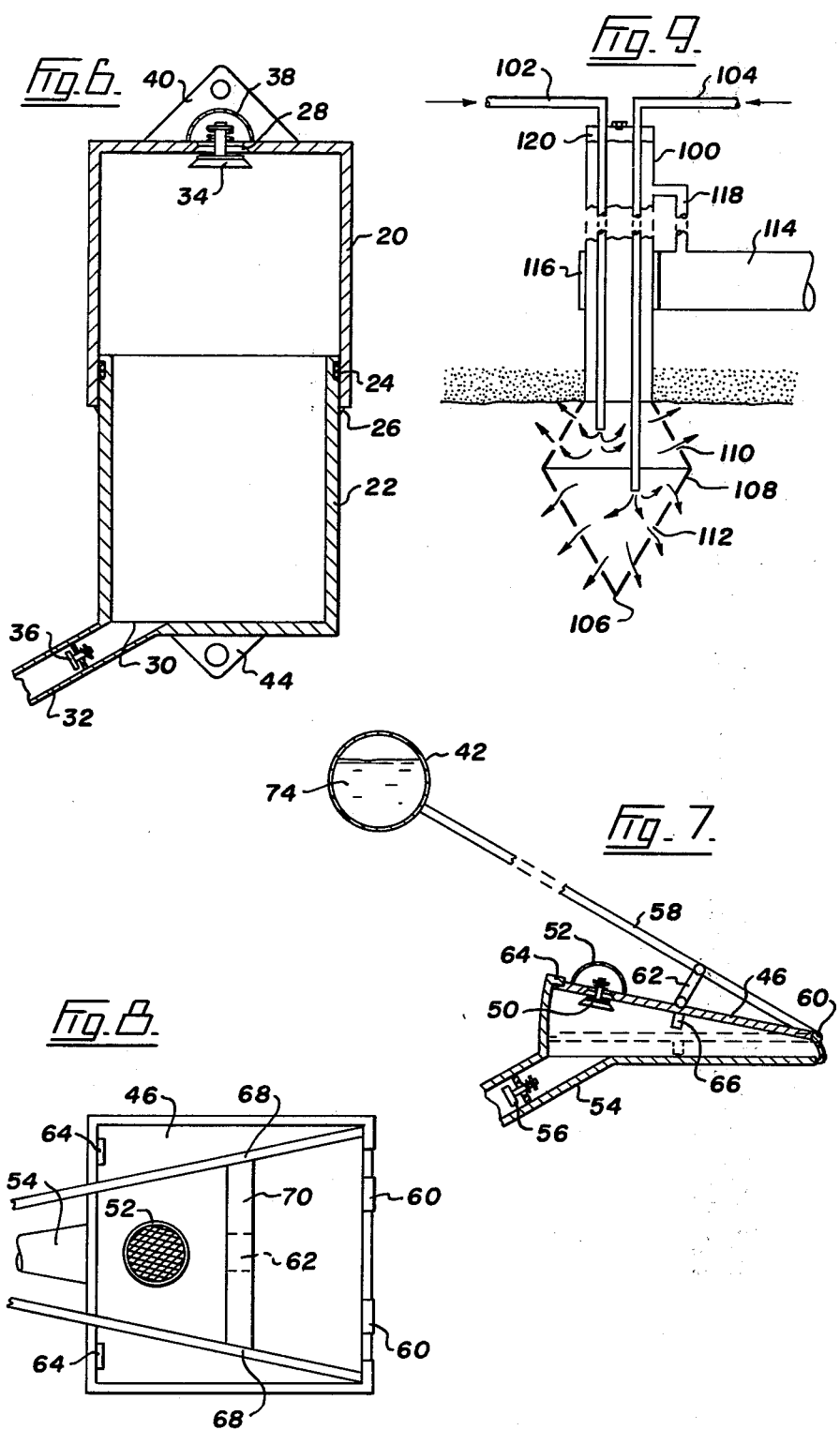

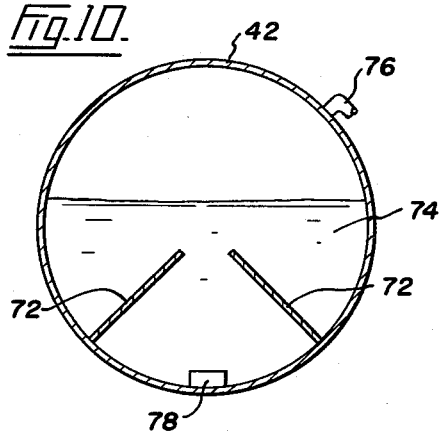
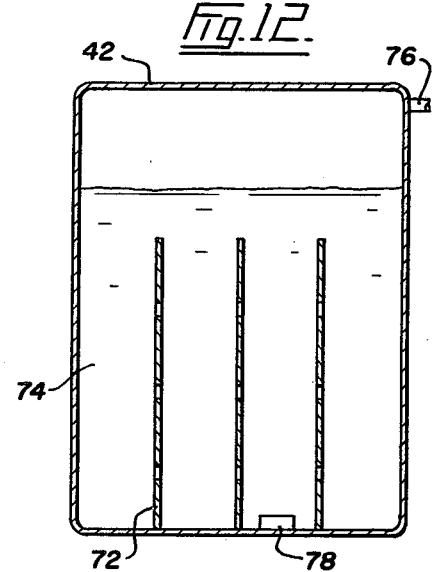
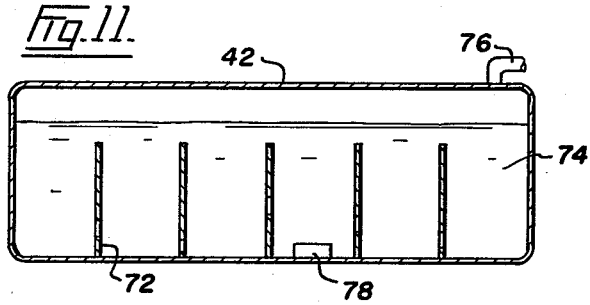
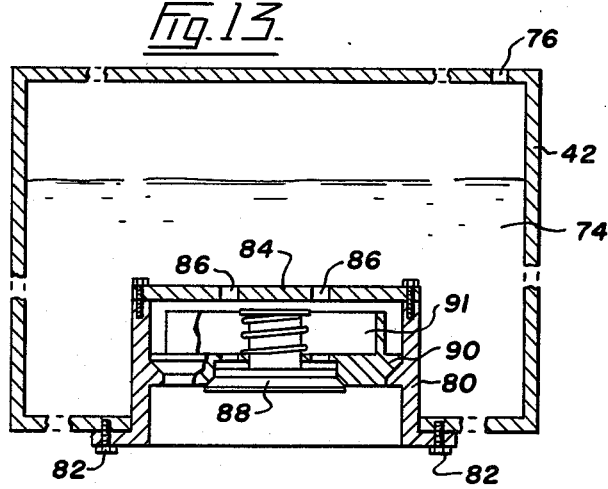

APPARATUS FOR PRODUCING POWER FROM WATER WAVES

FIELD OF INVENTION

This invention relates to an apparatus for producing power from water waves.

DESCRIPTION OF PRIOR ART

There is an increasing demand for energy from sources other than petroleum. In addition, concern for the environment has produced a resistance to schemes such as hydro-electric schemes either because of the building of dams on existing rivers or, particularly, where it is necessary to flood existing valleys to produce reservoirs to generate the necessary head of water.

It is known to use apparatus able to extract power from the sea. However, in the main, the existing apparatus is cumbersome and, in particularly stormy areas, unable to withstand the force of the waves.

SUMMARY OF INVENTION

Accordingly the present invention provides an apparatus for producing power from water waves that is simple. In a preferred embodiment the apparatus can be stopped during storms so that damage from heavy waves does not result.

Accordingly, in a first aspect, the present invention is an apparatus for producing power from water waves comprising a main pipe having at least one inlet and an outlet; a pump having an inlet to admit ambient water and an outlet communicating with the inlet of the pipe, a first valve controlling the inlet of the pump, a second valve controlling the outlet to the pump and a buoyancy vessel attached to the pump. The buoyancy vessel has a slight positive buoyancy to follow the motion of the waves, whereby reciprocation of the buoyancy vessel permits the water to enter the pump through the inlet and then forces water from the outlet into the pipe.

BRIEF DESCRIPTION OF DRAWING

Aspects of the invention, are illustrated, merely by way of example, in the accompanying drawings in which:

FIG. 1 is a general schematic view of a method of generating electricity using a reservoir feed by the system of the present invention;

FIG. 2 illustrates schemmatically the pumps according to the present invention.

FIG. 3 illustrates an arrangement of pumps according to the present invention;

FIG. 4 is a side view of the pumps of FIG. 3;

FIG. 5 is an end view of the pumps of FIG. 3;

FIG. 6 is a section through a pump useful in the present invention;

FIG. 7 is a section through a further pump useful in the invention;

FIG. 8 is a plan view, in part, of the pump of FIG. 7;

FIG. 9 illustrates a method of locating the system of the present invention on the sea bed;

FIGS. 10 to 12 illustrates buoyancy vessels useful in the apparatus of the present invention; and FIG. 13 illustrates a buoyancy vessel including a valve whereby the buoyancy of the vessel can be varied.

DESCRIPTION OF PREFERRED EMBODIMENTS

Referring to the drawings, FIGS. 1 and 2 illustrate diagrammatically a scheme for producing electricity that includes an apparatus according to the present invention. The apparatus is generally indicated in FIGS. 1 and 2. The apparatus includes a main pipe 2 and a pump 4. These are shown in more detail in later Figures. However, referring to FIG. 1, water is pumped by the pump 4, under the influence of the power of the waves, through the main pipe 2 to a reservoir 6 or to a power station 7. When the seas are relatively rough, that is when there is good wave motion, the water can be pumped partially to the power station 7 and partially to the reservoir 6. The reservoir 6 can then act as a supply of water to the power station for when the waves are relatively small.

On its way to the reservoir 6 or power station 7 the water passes through a desedimenting station 8 where sand and the like can be settled out. In addition, the water can be passed through desalinating station 10 before it passes to the reservoir 6. The main pipe 2 can be provided with a damper 12 which acts to reduce the shock of the pumping action of the pumps. The damper is a conventional hydraulic damper with an air space.

At the power station 7 electricity is generated in a conventional manner, typically using a turbine. Electric power can be taken from the power station through the power line 14. Water that is being used in generating electricity can be fed to the water mains through pipe 16. Excess water can be allowed to spill away through the spill way 18.

FIG. 2 in particular illustrates the action of a plurality of pumps 4 in the waves. These pumps are illustrated in more detail in FIGS. 6 and 7. The pump illustrated in FIG. 6 is a telescopic pump and is generally more useful in deeper water. It comprises an outer telescoping member 20 that telescopes over an inner telescoping member 22. There are seals 24 between the two members. In addition, in the preferred embodiment illustrated in FIG. 6, there are scrapers 26 attached to the lower edges of the outer telescoping member 20 in order to maintain the outer surface of the inner telescoping member 22 clear of sea weed, barnacles and the like.

The pump of FIG. 6 has an inlet 28 to admit ambient water and an outlet 30 that communicates through pipe 32 with the main pipe 2. There is a first valve 34 controlling the inlet and a second valve 36 controlling the outlet. The illustrated embodiment of FIG. 6 includes a filter screen 38 over the inlet 28. Valves 34 and 36 are conventional, spring loaded check valves. The pump of FIG. 6 has an anchoring flange 40 on its upper surface in order to attach it to a buoyancy vessel 42 as shown in FIGS. 1 to 5, and as described in more detail later.

The inner telescoping member 22 is formed with a lower anchoring flange 44 to attach or anchor the pump either to the bottom of the sea or to structure associated with the main pipe 2.

An advantage of the pump of FIG. 6 is that it can compensate for wave depth and tide depth. With high waves and/or high tides the telescoping members 20 and 22 are extended and the reciprocation is always relatively close to the extended position. With low tides and/or low waves the telescoping member 20 and 22 are compressed and the reciprocation is close to the closed or/telescopic position of the telescopic pump.

The pump illustrated in FIG. 7 has a diaphragm piston 46 having an inlet 48 including a check valve 50 protected by filter screen 52. The pump also has an outlet pipe 54 controlled by a second check valve 56. The outlet pipe 54 communicates with the main pipe 2. In the pump of FIG. 7 a buoyancy vessel 42 is mounted on a secondary lever 58 that is pivotted on the pump body at 60. A connecting rod 62 extends downwardly from the secondary lever 58 and is attached to the approximate centre of the diaphragm piston 46. Under the influence of the movement of the buoyancy vessel 42 the diaphragm piston 46 moves from an upper position shown in section in FIG. 7, where it is stopped by stop 64 built into the piston body. Its lower position is shown in dotted lines in FIG. 7. It is prevented from moving past that point by the lug 66 formed on the under side of diaphragm piston 46. As illustrated most clearly in FIG. 8 the secondary lever 58 is made up of two arms 68 joined a cross bar 70. The connecting rod 62 is attached to the cross bar 70.

FIGS. 10 to 13 illustrate various aspects of buoyancy vessels 42 useful in the apparatus of the present invention. It is desirable that the buoyancy vessel have means to vary its buoyancy. The desired buoyancy is a slightly positive buoyancy so that the buoyancy vessel will follow closely the motion of the wave. However, it is also desirable that it be possible to sink the buoyancy vessel in stormy weather. This sinking is carried out by filling up the buoyancy vessel with water. The vessel then sinks beneath the surface and avoids the pounding of the waves that it would normally receive at the surface.

FIG. 10 illustrates a spherical buoyancy vessel 42 provided at its interior with baffles 72 to restrict the movement of the water 74 within it. There is an air inlet/outlet 76 that is attached to a source of compressed air. There is also a water inlet/outlet 78 at the bottom of the buoyancy vessel 42. It will be appreciated that by varying the pressure of the air the amount of water 74 in the buoyancy vessel 42 can be controlled.

FIGS. 11 and 12 merely show different shapes of buoyancy vessels 42. They are also provided with baffles 72, with an air inlet/outlet 76 and with an water inlet/outlet 78.

FIG. 13 illustrates in more detail a preferred water inlet/outlet in the base of the buoyancy vessels 42. The inlet/outlet valve in the embodiment illustrated in FIG. 13 can easily be removed from the buoyancy vessel 42 for maintenance.

The inlet/outlet valve of FIG. 13 comprises a body 80 located within the buoyancy vessel 42 by bolts 82. At the top the body is closed by a plate 84 but there are openings 86 in the plate 84 to permit the passage of water. There is a spring loaded outlet valve 88 and an annular inlet valve 90 disposed around the outlet valve 88. By forcing air into the vessel the outlet valve 88 will be forced open against the urging of the spring, allowing water to be forced from the vessel. That is the buoyancy of the vessel is increased. Similarly if air is withdrawn through the inlet/outlet 76 then the resulting relatively increased pressure of the surrounding water will lift the inlet valve 90 off its seat to permit water to enter into the vessel 42 until the pressure is in equilibrium with the external water pressure. The outlet valve is provided with an annular wall 91 that abuts the upper plate 84 to control the amount of opening.

Generally speaking the spherical buoyancy vessel 42 shown in FIG. 10 is useful for all types of wave conditions. The relatively shallow vessel illustrated in FIG. 11 is for areas with low waves. The relatively tall vessel shown in FIG. 12 is for high wave areas.

It will be appreciated that the apparatus of the present invention seldom features just one or even a small number of pumps. The necessary power can only be generated by large numbers of pumps arranged over considerable areas of the sea. Part of such system is illustrated in FIG. 3. The main pipe 2 is provided with branch pipes 92 at an end remote from the outlet. Each branch pipe 92 terminates in an upwardly extending portion 94 that has air 96 trapped at the top. This air 96 acts as a damper for the branch pipes 92 and the main pipe 2. In the illustrated embodiment in FIG. 3 the branch pipes 92 are arranged in threes. The middle pipe is common to two rows of buoyancy vessels 42. As illustrated in FIG. 5, each buoyancy vessel 42 has an associated pump indicated generally by 4. Arm 68 which make up the secondary lever 58 referred to in FIGS. 7 and 8 are mounted on a pair of branch pipes 92 and extend to mount a buoyancy vessel 42, again as illustrated in FIG. 7. Each buoyancy vessel has positioned beneath it a pump 4 which, in the illustration used in FIGS. 3 to 5 is a telescopic pump as illustrated in FIG. 6. In the embodiment of FIGS. 3 to 5 the arms 48 are pivotally mounted on pylons 98. The branch pipes 92 can also form a runway, for example for use with a crane that is needed to maintain the system.

The system of FIGS. 3 to 5 is simple in function. As illustrated in FIG. 4 the buoyancy vessels 42 rise with the crest of the wave. As a result the outer telescoping member 20 of, for example, the pump illustrated in FIG. 6 or the piston 46 of the pump of FIG. 7 is moved upwardly causing an increase in the volume of the interior of the pump and thus a decrease in pressure. As a result of this decrease in pressure water is drawn into the pump body through the inlet valve 34 or 50. After the crest of the wave the buoyancy vessel 42 falls into the trough thus driving down the piston 46 or the outer telescoping member 20. As a result water is forced through the outlets 32 or 54, past the check valves 36 or 56. The water is forced into the main pipe 2 and, for example, can be used as in the manner illustrated in FIG. 1.

A valuable feature of the invention is the means of locating a system comprising main pipes 2 and a plurality of branch pipes 92 on the base of the ocean, particularly where the base is sandy. Such a system is illustrated in FIG. 9 which shows a post 100 having a first pipe 102 communicating with its exterior and a second, pipe 104 also communicating with the exterior but extending lower than the pipe 102. At its base post 100 is pointed at 106. In the preferred illustrated embodiment the foot of the post 100 is a cone 108 having outlets 110 above its centre line and further outlets 112 below its centre line. A pipe line frame 114, for example a branch pipe 92 or a main pipe 2, is clamped to the post 100 at 116. In the illustrated embodiment there is small branch pipe 118 communicating the interior of pipe frame work 114 with the interior of the post 100. This enables an air space 120 at the top of the locating post 100 to act as a damper for the system.

The system illustrated in FIG. 9 operates as follows. When it is desired to locate the system in, for example, a sandy or muddy bottom water is forced in through the pipe 104 after the post 100 has been lowered to the bottom. The water and air forcing out under a high pressure through the outlets 112 move the sand or mud and help the cone to bury into the sand or mud. As it forces its way down the sand or mud repositions itself around the cone 108 to provide a firm location. Once the cone 108 is in the desired position the air and water forced in through pipe 104 can be stopped. To remove the cone 108 air and water is forced through the pipe 102. The air and water forces out through the opening 110 in the upper part of the cone 108, thus blowing away the locating sand or mud and permitting easy removal of the cone 108 from the ocean bottom.

The system illustrated in FIG. 9 can be used in rocky ocean bottoms, however, there it is first necessary to blast or drill a cavity in the ocean bottom. Sand can then be placed over the cone once the cone has been located within the formed cavity. In this embodiment it might only be necessary to form the cone with outlets 110 in order to remove the cone 108 from the formed cavity. However, the outlets 112 are also useful to blast out sand that may drift into a formed cavity.

Once the cone 108 is in position then, the post 100 is filled with water to the level illustrated in FIG. 9 so that it is of negative buoyancy. That is the water acts as ballast.

The pump units of the present invention may be mounted on cross pipes 93 extending between the branch pipes 92 illustrated in FIG. 3, as seen in FIG. 5. There may be located on platforms formed between the pipes 92 or they may be anchored to the bottom. This last mounting is particularly so in the case of the telescopic member shown in FIG. 6.

The apparatus of the present invention will typically be of robust construction. The material should be corrosion resistant. However, it should be emphasized that because the buoyancy vessels can be sunk in inclement weather and the system thus not used in that weather, it is free of many of the problems of prior art systems that derive power from the waves.

Typically the buoyancy vessels 42 will have a diameter of about 10 feet and will be arranged at a density of about 200 to 300 per acre, for example 240 to 252 per acre.

It is clearly difficult to make calculations for power outputs of systems according to the invention but, for example, with 6 feet high waves at 6 second intervals and with 252 pumps per acre there is available 1483.65 cubic feet at a head pressure of 133.4 feet or a total of 22490.7 horsepower or 16755 kilowatts of electricity or 0.51 horsepower per square foot. This output will increase with wave height.

A typical cross section for a telescopic pump will be about 3 feet. The height of a telescopic pump will vary widely with different area of the sea depending on depth and wave height.

An advantage of the invention that should be mentioned is its wave-breaking effect.

I claim:

1. An apparatus for producing power from water waves comprising:
   a main pipe having at least one inlet and an outlet;
   a pump having an inlet to admit ambient water and an outlet communicating with the inlet of the pipe;
   a first valve controlling the inlet to the pump;
   a second valve controlling the outlet from the pump; and
   a buoyancy vessel attached to the pump, said buoyancy vessel having a slightly positive buoyancy to follow the motion of the wave, said buoyancy vessel containing water and air in order to establish the slightly positive buoyancy and having means to control the relative amounts of water and air in order to vary the buoyancy;
   an air inlet/outlet, a water inlet valve and a water outlet valve in said buoyancy vessel;
   and an air line communicating with the air inlet/outlet in said buoyancy vessel whereby compressed air can be forced into the vessel to force water through the water outlet valve or air can be drawn from the vessel to permit the entry of additional water;
   whereby reciprocation of the buoyancy vessel permits water to enter the pump, through the inlet, and then forces water from the outlet into the pipe.

2. An apparatus as claimed in claim 1 including a plurality of pumps, each having a buoyancy vessel associated with it and each having an outlet into the main pipe.

3. An apparatus as claimed in claim 1 in which the outlet of the pipe communicates with a reservoir.

4. An apparatus as claimed in claim 1 in which the buoyancy vessel is mounted on a lever that is attached to the pump.

5. An apparatus as claimed in claim 4 in which the lever is a secondary lever pivotally attached to a base at one end and attached to the buoyancy vessel at the other end, a connecting rod extending from the lever to the pump between the two ends of the lever.

6. An apparatus as claimed in claim 1 in which the main pipe includes air spaces as dampers.

7. An apparatus as claimed in claim 1 in which the pump is a a telescopic pump having an inlet valve in the top and an outlet valve adjacent its bottom;
   seals between the telescoping parts of the pump and anchoring means on top to permit attachment of the buoyancy vessel.

8. An apparatus as claimed in claim 7 including anchoring means on the bottom to permit attachment of the buoyancy vessel to the remainder of the apparatus.

9. Apparatus as claimed in claim 7 in which the inlet has a filter screen over it.

10. Apparatus as claimed in claim 7 in which the telescopic pump has scrapers at the lower edge of the outer telescoping member to maintain the outer surface of the inner telescoping member clear.

11. Apparatus as claimed in claim 1 in which the pump is a diaphragm piston pump having an inlet at the top of the piston and an outlet at the bottom of the pump, and means to attach the buoyancy vessel to the piston.

12. An apparatus as claimed in claim 11 in which the means to attach the buoyancy vessel is a secondary lever pivoted at the pump at one end, and attached to the buoyancy vessel at its other end, a connecting rod in the middle of the lever to attach the lever to the piston.

13. An apparatus as claimed in claim 1 in which the main pipe is mounted on posts to permit its location on a sea bed, the pipe being clamped to the posts by releasable clamps so that the position of the pipe on the posts can be varied.

14. An apparatus as claimed in claim 13 in which each post has an inlet an outlet for air and water;
   pointed feet formed on each post and openings in the feet whereby air and water can be forced through the openings in the feet to dig the feet into a bed of sand, the water being left in the post after the posts has been positioned as ballast.

15. Apparatus as claimed in claim 13 in which the posts communicate with the main pipe and have air spaces at their tops to provide damping.

16. Apparatus as claimed in claim 14 in which the feet are cones.

17. An apparatus for producing power from water waves comprising:
- a main pipe having at least one inlet and an outlet;
- a pump having an inlet to admit ambient water and an outlet;
- a first valve controlling the inlet to the pump;
- a second valve controlling the outlet from the pump;
- branch pipes attached to the main pipe at a position remote from its outlet;
- a buoyancy vessel mounted above the two adjacent branch pipes but in a plane between the branch pipes, said buoyancy vessel having a slightly positive buoyancy to follow the motion of the waves;
- levers extending from said adjacent branch pipes to pivotally locate the buoyancy vessel;
- a connecting rod joining said buoyancy vessel to said pump; and
- a cross pipe between said adjacent branch pipe, said outlet of said pump communicating with said cross pipe whereby reciprocation of the buoyancy vessel permits water to enter said pump through said inlet and then forces water from said outlet into said cross pipe and into said main pipe.

18. An apparatus as claimed in claim 17 including a plurality of said pumps, a plurality of said buoyancy vessel, and a plurality of said cross pipes, and in which the branch pipes are arranged in threes, the middle pipe being common to two rows of buoyancy vessels, each buoyancy vessel having an associated pump.

* * * * *